US005422668A

United States Patent [19]

Chanteau et al.

[11] Patent Number: 5,422,668

[45] Date of Patent: Jun. 6, 1995

[54] TELEVISION SIGNAL SWITCHING DEVICE FOR A CABLE DISTRIBUTION SYSTEM

[75] Inventors: Pierre Chanteau, La Haye Malherbe; Bertrand Haffray, St Etienne du Rouvray, both of France

[73] Assignee: U.S. Philips Corporation, New York, N.Y.

[21] Appl. No.: 181,261

[22] Filed: Jan. 12, 1994

[30] Foreign Application Priority Data

Jan. 13, 1993 [FR] France ........ 93 00246

[51] Int. Cl.⁶ ........ H04N 7/16

[52] U.S. Cl. ........ 348/6; 348/706; 455/4.2

[58] Field of Search ........ 348/6, 8, 10, 11, 705, 348/706; 455/4.1, 4.2, 6.1; 358/86; H04N 7/16

[56] References Cited

U.S. PATENT DOCUMENTS

| | | | |
|---|---|---|---|
| 4,039,954 | 8/1977 | Den Toonder | 325/308 |
| 4,363,033 | 12/1982 | Lovely | 348/706 |
| 4,525,738 | 6/1985 | Imazeki et al. | 348/6 |
| 4,638,181 | 1/1987 | Deiss | 348/706 |
| 4,802,239 | 1/1989 | Ooto | 348/6 |

FOREIGN PATENT DOCUMENTS

| | | | |
|---|---|---|---|
| 142090 | 9/1982 | Japan | 358/86 |
| 8202303 | 7/1982 | WIPO | 358/86 |

*Primary Examiner*—James J. Groody
*Assistant Examiner*—Chris Grant
*Attorney, Agent, or Firm*—Michael E. Marion

[57] ABSTRACT

The invention relates to the selection of a source from a plurality of sources by means of shunt switches and series switches, which are respectively turned on and mined off, and vice versa. For access to, for example, four sources the device has two intermediate terminals $B_1$, $B_2$), one series switch ($SE_a$, $SE_b$) is arranged between the user installation and each of the two intermediate terminals, and each of the intermediate terminals is coupled to two sources ($IN_1$, $IN_2$ or $IN_3$, $IN_4$) by each time one series switch ($SE_1$, $SE_2$, $SE_3$, $SE_4$). Moreover, each source ($IN_1$, $IN_2$, $IN_3$, $IN_4$) is a.c. coupled to earth by a matching impedance in series with a shunt switch ($Z_1$, $SH_1$, or $Z_2$, $SH_2$, or $Z_3$, $SH_3$, or $Z_4$, $SH_4$). The device is used in CATV.

2 Claims, 2 Drawing Sheets

TELEVISION SIGNAL SWITCHING DEVICE FOR A CABLE DISTRIBUTION SYSTEM

The invention relates to a switching device for high-frequency (VHF-UHF) signals, adapted to couple a user installation to a signal source by selecting said source from a plurality of sources, which device comprises an output terminal to be coupled to the user installation, input terminals to be coupled each to a signal source, and between the output terminal and each input terminal a connection in which a series switch is arranged, which series switch comprises at least one diode which can be mined on or mined off by means a d.c. control voltage, means being provided to turn on said series switch in the connection corresponding to the selected source and to turn off said switch in each of the other connections. Such a device is used particularly in a head end or in a junction box of an MATV television distribution system.

Such a device is known from the document U.S. Pat. No. 4,039,954 (Pieter den Toonder). Said document describes a system serving four user channels over each of which a television signal is to be distributed or not. This is effected by means of four switches of a type as defined in the opening sentence.

A problem arises with this type of switch when a plurality of these switches have one of their terminals in common (star connection). The mined-off switches as well as the lines leading to these switches exhibit parasitic capacitances which, added to one another and in series with the parasitic inductance of the turned-on switch, form a low-pass filter which may limit the pass band to an undesirable extent.

SUMMARY OF THE INVENTION

The invention solves this problem in that the device comprises at least a first group of intermediate terminals, a series switch is arranged between the output terminal and each of the intermediate terminals of this group, and each of the intermediate terminals of this group is coupled to a plurality of input terminals via at least one series switch for each input terminal. Thus, each mined-on switch is connected to a limited number of turned-off switches, which limits the parasitic capacitance.

In a special embodiment having $m^2$ input terminals, the first group comprises m intermediate terminals, said intermediate terminals each being coupled to m input terminals. Thus, for example for $m=2$, each turned-on switch is connected to only one turned-off switch, as a result of which the parasitic capacitance is minimised.

A more complex embodiment comprises a second group of intermediate terminals, a series switch being arranged between the output terminal and each of the intermediate terminals of the first group, whose terminals are each coupled to a plurality of intermediate terminals of the second group by each time one series switch, and each of the intermediate terminals of the second group are coupled to a plurality of input terminals by each time one series switch. This embodiment enables an even larger number of channels to be selected.

In a special modification of the last-mentioned embodiment having $m^3$ input terminals, the first group comprises a number of m intermediate terminals and the second group a number of $m^2$ intermediate terminals of a second level, an intermediate terminal of the first group is coupled to m intermediate terminals of the second group, and an intermediate terminal of the second group is coupled to m input terminals. This modification gives each user the possibility of selecting, for example, eight different channels with an excellent isolation relative to the non-selected channels.

It is advantageous if certain series switches comprise a plurality of diodes in series, and a shunt capacitance to earth is arranged between two diodes of said plurality of diodes in series. With the parasitic inductances of the diodes (when turned off) said shunt capacitances form a kind of rudimentary low-pass filter, which improves the isolation.

It is advantageous if each of the input terminals is a.c. coupled to earth via a matching impedance in series with a shunt switch formed by a diode. Thus, the blocked channels do not disturb the impedance matching of the channel used, which would be the case if the turned-off switches were earthed directly or were left "floating".

A particularly advantageous arrangement of the diodes in the set of switches is obtained when the end of the shunt switch at the earth side is isolated from earth for direct current and is coupled to a first d.c. bias source, in that all the diodes of the series switches and of the shunt switch corresponding to the same connection are arranged with their junctions cascaded in the same direction, in that the end which is remote from the input terminal of the cascade of diodes of the series switches is coupled to a second d.c. bias source, and in that the node between the shunt switch and the cascade of diodes of the series switches is coupled to a control voltage source, the first and the second d.c. bias source being dimensioned in such a way that in the absence of a control voltage the cascade of all the diodes is biased in the forward direction. This arrangement enables a channel to be controlled by means of a single control voltage and with a minimal number of decoupling resistors and capacitors.

An arrangement implemented on a printed circuit board and adapted to serve an even number of user installations by means of an equal even number of switching devices as defined above is characterised in that the switching devices are arranged in pairs on the printed circuit board, the signal input terminals of a switching device of a pair are each connected to an input terminal of the other switching device of the pair by means of a connection provided on one side of the printed circuit board, and the last-mentioned connection itself is coupled by a through-connection to a track provided on the other side of the printed circuit board and connected to a signal source.

These and other more detailed aspects of the invention will become apparent from the following description of an embodiment given by way of non-limitative example.

DETAILED DESCRIPTION OF PREFERRED EMBODIMENT OF THE INVENTION

Figure 1:
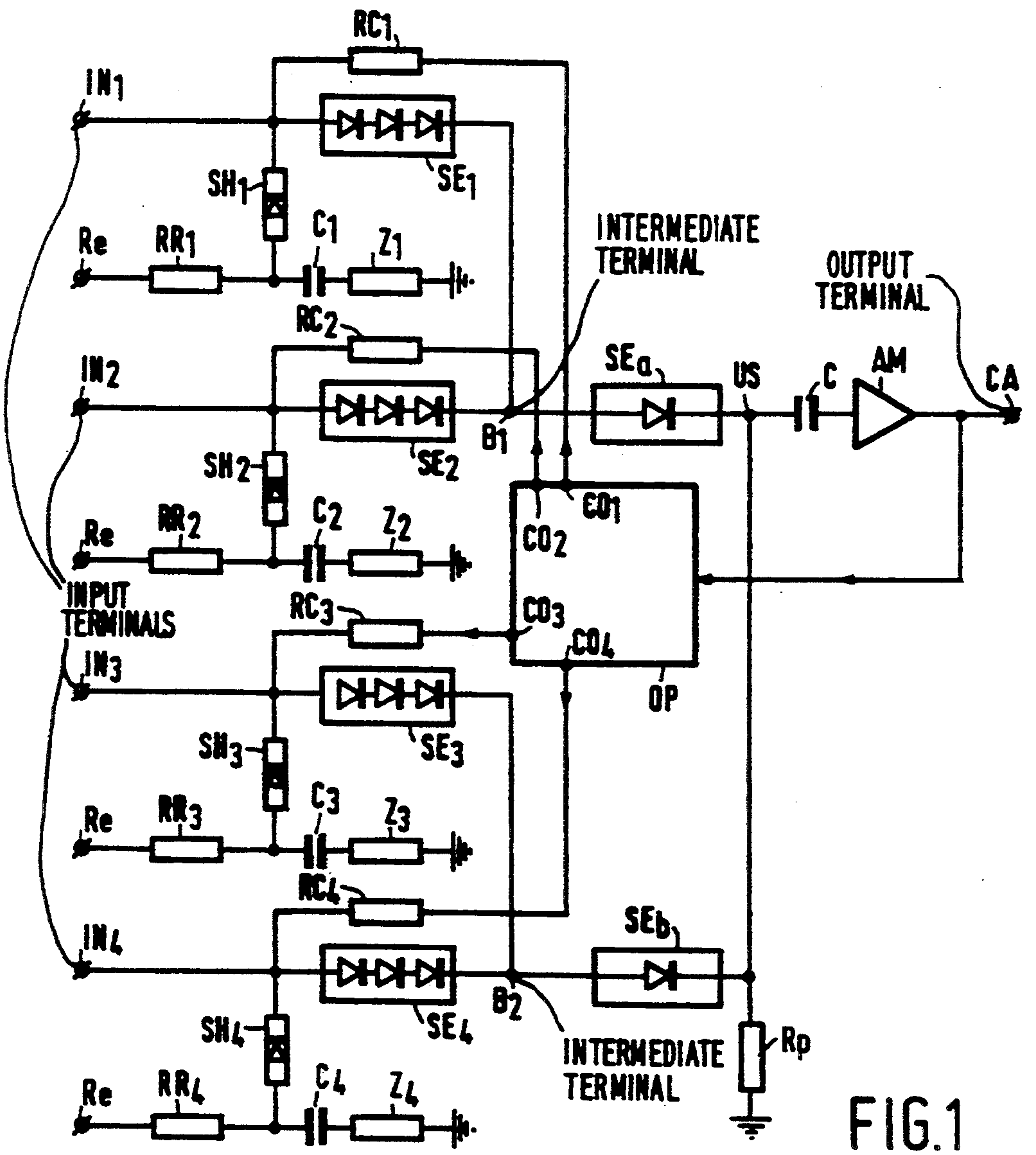
FIG. 1 is diagram of a switching device in accordance with the invention.

The device, whose diagram is shown in FIG. 1, is intended for selecting one of four source signals to serve a user installation. The signals from the four sources (not shown) are applied to four input terminals $IN_1$, $IN_2$, $IN_3$, $IN_4$. An output terminal CA is connected to a user installation by a cable (not shown).

A first connection couples the input $IN_1$ to the output terminal CA via a first series switch $SE_1$, an intermediate terminal $B_1$ and a second series switch $SE_a$. A second connection couples the input $IN_2$ to the output terminal CA via a series switch $SE_2$, followed by the intermediate terminal $B_1$ and the second series switch $SE_a$, which are common to the first connection.

A third connection couples the input $IN_3$ to the output terminal CA via a first series switch $SE_3$, an intermediate terminal $B_2$ and a second series switch $SE_b$. A fourth connection couples the input $IN_4$ to the output terminal CA via a series switch $SE_4$, followed by the intermediate terminal $B_2$ and the second series switch $SE_b$, which are common to the third connection.

The switches $SE_1$ to $SE_4$ are formed by three diodes in series and the switches $SE_a$ and $SE_b$ comprise a single diode. In order to ensure that the impedance at the output of the switches is correct regardless of what the users may do, an amplifier stage AM, which is common to the four connections, is arranged before the output terminal CA in order to provide the required input impedance at a terminal US to which it is coupled by a coupling capacitance C and to which the second switches $SE_a$ and $SE_b$ are coupled.

The input terminal $IN_1$ is coupled to a first end of a shunt switch $SH_1$ and, likewise, the input terminal $IN_2$ is coupled to a first end of a shunt switch $SH_2$, the input terminal $IN_3$ is coupled to a first end of a shunt switch $SH_3$, and the input terminal $IN_4$ is coupled to a first end of a shunt switch $SH_4$. The shunt switches $SH_1$ to $SH_4$ comprise a single diode. Each of their second ends is a.c. coupled to earth via a capacitance (for example C1), to block the flow of direct current, in series with a matching impedance (for example $Z_1$). The matching impedances are selected depending on the standard impedance of the cables and of the inputs and outputs, in such a manner that the device presents the same impedance to a source when a connection has been selected (i.e. the input impedance of the amplifier AM seen via turned-on series switches, for example $SE_1$ and $SE_a$) and when it has not been selected.

Each of the second ends of the shunt switches $SH_1$ to $SH_4$ is coupled to a first source of d.c. reference voltage Re. In each series switch which is remote from the input terminal ($SE_a$, $SE_b$) the end of the diode which is remote from the input terminal (at the right in the Figure) is coupled to a second source of d.c. bias, in the present case earth, by a resistor Rp. Moreover, the diode of the shunt switch $SH_1$ corresponding to the first connection (i.e. the connection from $IN_1$ to US and CA) is arranged in series with all the diodes of the switches $SE_1$ and $SE_a$ with such a polarity that all the diode junctions are cascaded in the same direction and a similar current can flow in series through all these diodes, from the source Re to earth.

The node between the shunt switch SH and the cascade of diodes of the series switches $SE_1$ and $SE_a$, which node is also coupled to the input terminal $IN_1$, is connected to a control terminal $CO_1$ via a resistor $RC_1$, to control the selection of the first connection. If the reference voltage Re is, for example, 6 V a control voltage $CO_1$ of 12 V will turn on the series switches $SE_1$ and $SE_a$ and turn off the shunt switch $SH_1$, so that the connection corresponding to the input terminal $IN_1$ is selected. If this voltage $CO_1$ is equal to or smaller than zero the switches $SE_1$ and $SE_a$ will be turned off, the switch $SH_1$ will be turned on and the connection will not be selected. It is obvious that the three other connections from the input terminals $IN_2$, $IN_3$ and $IN_4$, respectively, to the terminal US are implemented and operate in the same way.

Instead of being arranged between each switch SH and earth the matching impedances Z may also be arranged in series with each resistor RR between the latter and the corresponding switch SH, the node between Z and RR having a capacitive coupling to earth. Alternatively, the resistors RR may have the desired impedance value with a coupling to earth at the terminals Re.

An advantageous choice for the elements in the diagram may be as follows:

all the diodes:BA 592 (PIN diode)
the resistors $RC_1$ to $RC_4$ and Rp:approx. 1.5 kΩ
the resistors $RR_1$ to $RR_4$:approx. 12 kΩ
the capacitances $C_a$, $C_b$:approx. 0.5 pF
the capacitances $C_1$ to $C_4$ and C:approx. 330 pF The value of $Z_1$ to $Z_4$ depends on the number of installations to be served in parallel and on the normalised impedance of the lines and if this impedance is 75 Ω and there are four installations (as in the case of FIG. 5 described below) Z is selected to be 300 Ω, just like the input impedance of the amplifier AM.

With the aid of customary means, not shown, control voltages $CO_1$ to $CO_4$ can be supplied in such a manner that one of these voltages is 12 V and the other three voltages are at earth level. For example, if the user installation comprises means for generating a control signal indicating to which of the plurality of sources the user installation is to be connected by the cable and for feeding this control signal into the cable to the distribution system, i.e. in the present case to the terminal CA, the device shown in the Figure will comprise means OP for converting said control signal on the cable into four d.c. control voltages applied to the four terminals $CO_1$ to $CO_4$. The control signal may for example be just 14 V d.c., 14 V d.c. plus 1 V a.c. of 22 kHz, just 18 V d.c., or 18 V d.c. plus 1 V a.c. of 22 kHz, which yields four possibilities which each correspond to a different choice to be effected by means of the switching device. The distinction between 14 and 18 V can be made in known manner by means of comparators, which compare the control voltage received on the cable with a direct voltage of 16 V, and whether the alternating voltage has been or has not been superimposed on the direct voltage can be detected by a rectifier circuit which supplies a logic signal indicating the presence of the a.c. component, the logic signals being finally combined to define to which of the terminals $CO_1$ to $CO_4$ the voltage of 12 V is applied.

Figure 2:
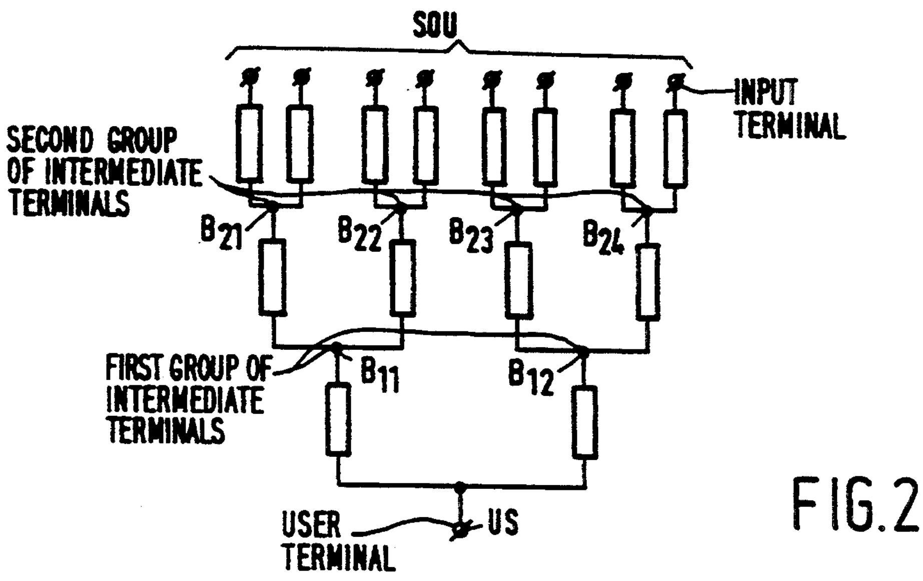
FIGS. 2 and 3 show diagrammatically two embodiments of a device.

FIG. 2 shows an arrangement providing a choice from eight television signal sources SOU. The sources are arranged in four groups of two sources. The device has two groups of intermediate terminals with two intermediate terminals $B_{11}$, $B_{12}$ in the first group and four intermediate terminals $B_{21}$, $B_{22}$, $B_{23}$, $B_{24}$ in the second group and a series switch shown symbolically as a rectangle is arranged between the user installation US and each of the two intermediate terminals $B_{11}$, $B_{12}$ of the first group, which terminals $B_{11}$, $B_{24}$ are coupled to two respective intermediate terminals $B_{21}$, $B_{22}$ and $B_{23}$, $B_{24}$ of the second group by each time one series switch, and each of the intermediate terminals of the second group is coupled to two sources by each time one series switch. A shunt switch, not shown for the simplicity of the Figure, is connected to each input terminal SOU.

Figure 3:
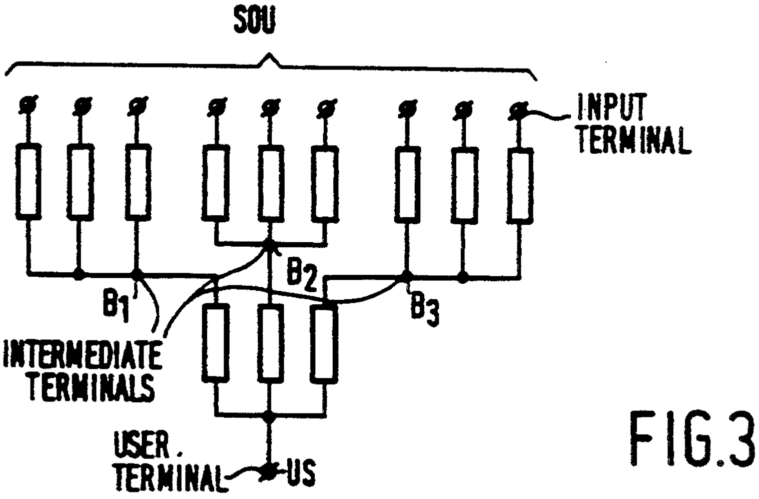

FIG. 3 shows an arrangement providing a choice from nine television signal sources SOU. Three series switches, each shown symbolically as a rectangle, are arranged between a user terminal US and three intermediate terminals $B_1$, $B_2$, $B_3$, respectively. The sources are arranged in three groups of three sources, each of the three sources of a group being coupled to an intermediate terminal by each time one series switch. A shunt switch, not shown for the simplicity of the drawing, is connected to each input terminal SOU. Such a device is less satisfactory than that shown in FIG. 2 because each turned-on diode is coupled to two mined-off diodes (instead of one in the case of FIG. 2), either at an intermediate terminal or at the output terminal US, so that the parasitic capacitance is higher.

It is evident that in the arrangements shown in FIGS. 2 and 3 the diodes of the series switches are still cascaded in each connection with the same polarity between an input terminal SOU and the output terminal US.

Figure 4:
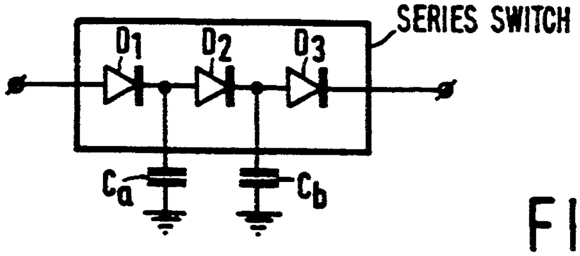
FIG. 4 is a more detailed diagram of a series switch.

The series switch shown in FIG. 4 comprises three diodes $D_1$, $D_2$, $D_3$ in series. A capacitance $C_a$, $C_b$ is shunted to earth between the diodes $D_1$, $D_2$ and $D_2$, $D_3$, respectively. The switches $SE_1$ to $SE_4$ in FIG. 1 may be implemented in this way and all the other switches comprise a single diode.

Figure 5:
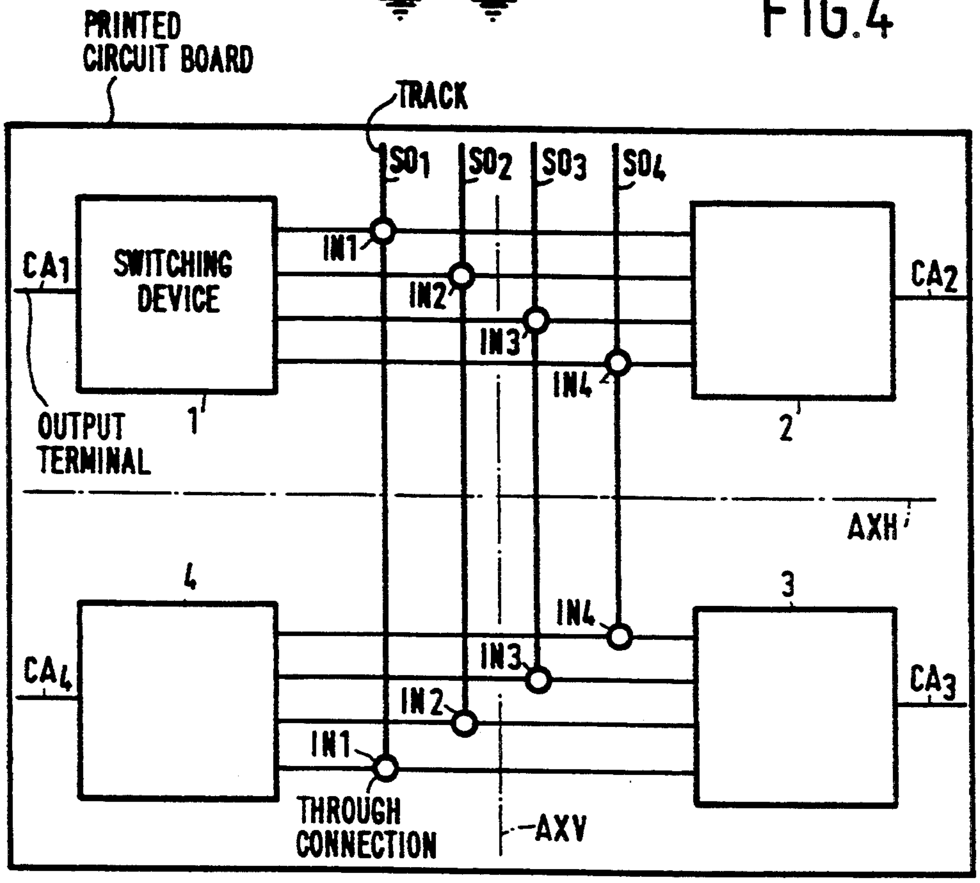
FIG. 5 shows an arrangement adapted to serve four user installations by means of four elementary switching devices.

The arrangement shown in FIG. 5 comprises four switching devices 1-4, each corresponding to the diagram of FIG. 1 and incorporated in a printed circuit board CI, to serve four user installations, not shown, which are each connected to one of the output terminals CA1 to CA4 of the devices. The devices are arranged in pairs 1-2 and 3-4. The two devices 1 and 2 and the two devices 3 and 4 are arranged symmetrically relative to an axis AXV, which extends in a vertical direction in the Figure. The signal input terminals of a switching device of one pair (1 or 4) are each connected to an input terminal of the other switching device of the pair by means of a connection formed by a track on one side of the printed circuit board CI, and each of these connections is coupled to another track $SO_1$, $SO_2$, $SO_3$, $SO_4$ (shown in heavy lines) on the other side of the printed circuit board by a through-connection $IN_1$, $IN_2$, $IN_3$, $IN_4$, respectively. They are each connected to a signal source, not shown.

For comparatively low frequencies the printed circuit board is of the double-sided type and the through-connections are plated-through holes. For high frequencies cross-talk is likely to occur between the tracks on opposite sides of the board. In that case a three-layer circuit with a central earth layer may be used or two single-sided printed circuit boards placed back to back with an interposed partition of a conductive material having holes for the passage of the through-connections $IN_1$, $IN_2$, $IN_3$, $IN_4$ formed by, for example, separate metal pins.

The impedances should be matched in the case of four devices. The impedances Z in FIG. 1 as well as the input impedance of the amplifier A are then chosen to be equal to four times the normalised impedance of the lines of the installation.

It is obvious that the same type of arrangement can readily be adapted to other even numbers of user installations, for example by adding other pairs of devices such as the pair of devices 1-2 or the pair of devices 3-4, and to other numbers of available sources, each of the devices 1-4 corresponding to, for example, the diagram in FIG. 2 or FIG. 3.

We claim:

1. A device for selecting a signal source from a plurality of sources, said device comprising:
- a plurality of input terminal groups, an input terminal group of said plurality of input terminal groups having a plurality of input terminals;
- a first group of intermediate terminals;
- an output terminal;
- a plurality of series switches, each series switch of the plurality of series switches having at least one diode which can be turned on or turned off by means of a d.c. control voltage,
- first connections between the output terminal and every individual intermediate terminal in the first group of intermediate terminals, each first connection having one of said series switches arranged therein;
- second connections between each intermediate terminal in the first group of intermediate terminals and every individual input terminal in the plurality of input terminals, each second connection having at least one of said series switches arranged therein;
- means for turning on said series switches of said plurality of series switches in one of the first connections and one of the second connection corresponding to a selected source and for turning off said series switches in each of the other first connections and each of the other second connections.

2. The device as claimed in claim 1, further comprising:
- a second group of intermediate terminals, and wherein each second connection has two series switches therein, a first series switch between the intermediate terminal of the first group of intermediate terminals and an intermediate terminal of the second group of intermediate terminals, and a second series switch between the intermediate terminal of the second group and the input terminal connected by said second connection .

* * * * *